(12) United States Patent
Goeringer et al.

(10) Patent No.: US 12,063,314 B1
(45) Date of Patent: *Aug. 13, 2024

(54) SYSTEMS AND METHODS FOR SECURE EVENT AND LOG MANAGEMENT

(71) Applicant: CABLE TELEVISION LABORATORIES, INC, Louisville, CO (US)

(72) Inventors: Steven J. Goeringer, Westminster, CO (US); Brian A. Scriber, Lafayette, CO (US); Massimiliano Pala, Denver, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/220,136

(22) Filed: Jul. 10, 2023

Related U.S. Application Data

(63) Continuation of application No. 16/402,228, filed on May 3, 2019, now Pat. No. 11,700,132.

(60) Provisional application No. 62/665,987, filed on May 2, 2018, provisional application No. 62/665,983, filed on May 2, 2018.

(51) Int. Cl.
*H04L 9/32* (2006.01)
*H04L 9/00* (2022.01)

(52) U.S. Cl.
CPC .......... *H04L 9/3263* (2013.01); *H04L 9/3226* (2013.01); *H04L 9/3236* (2013.01); *H04L 9/3247* (2013.01); *H04L 9/321* (2013.01); *H04L 9/50* (2022.05)

(58) Field of Classification Search
CPC ... H04L 9/3263; H04L 9/3226; H04L 9/3236; H04L 9/3247; H04L 9/50; H04L 9/321
USPC .......................................................... 713/175
See application file for complete search history.

(56) References Cited

U.S. PATENT DOCUMENTS

| | | |
|---|---|---|
| 10,361,869 B2 | 7/2019 | Gorman |
| 10,411,905 B2* | 9/2019 | Smith ................. H04L 63/0823 |
| 10,547,457 B1* | 1/2020 | Duccini .................... H04L 9/50 |
| 10,558,955 B2 | 2/2020 | Haldenby et al. |
| 10,673,775 B2 | 6/2020 | Asthana et al. |
| 10,680,833 B2* | 6/2020 | Yang .................... H04W 12/40 |
| 10,789,597 B2 | 9/2020 | Brashers |
| 11,018,876 B2 | 5/2021 | Kaga et al. |
| 11,082,420 B2 | 8/2021 | Uhr et al. |
| 2017/0124556 A1 | 5/2017 | Seger |
| 2019/0207759 A1 | 7/2019 | Chan et al. |

* cited by examiner

*Primary Examiner* — Amare F Tabor
(74) *Attorney, Agent, or Firm* — Josh C. Snider; Snider IP

(57) ABSTRACT

A security event management system for an electronic connected network includes a public key infrastructure subsystem configured to generate a security ID for a connected device accessing the network, a digital ledger, a trigger list in operable communication with the digital ledger, and an event manager configured to (i) subscribe to the trigger list by defining at least one reportable event of which the trigger list is to advise the event manager, and (ii) receive a notification from the trigger list upon validation of the at least one reportable event behind the digital ledger.

20 Claims, 3 Drawing Sheets

SYSTEMS AND METHODS FOR SECURE EVENT AND LOG MANAGEMENT

CROSS REFERENCE TO RELATED APPLICATIONS

This application is a continuation of U.S. application Ser. No. 16/402,228, filed May 3, 2019. U.S. application Ser. No. 16/402,228 claims the benefit of and priority to U.S. Provisional Patent Application Ser. No. 62/665,983, filed May 2, 2018, and also to U.S. Provisional Patent Application Ser. No. 62/665,987, filed May 2, 2018. The respective disclosures of all of these prior applications are incorporated herein by reference in their entireties.

BACKGROUND

The field of the disclosure relates generally to management of events and logs in a communications network, and more particularly, to management of events and logs utilizing a consensus network.

Many conventional electronic devices utilize a Public Key Infrastructure (PKI) to validate electronic signatures in a variety of technology fields, such as telecommunications (e.g., mobile communication devices), the Internet of Things (IoT), online banking, secure email, and e-commerce. PKI uses a pair of cryptographic keys (e.g., one public and one private) to encrypt and decrypt data. PKI implementation enables obtaining and renewal of X.509 certificates, which are used to establish trust between ecosystem elements, including, for example, devices. PKI conventionally encrypts communications using protocols such as Transport Layer Security (TLS), etc. A PKI typically includes policies and procedures for encrypting public keys, as well as the creation, management, distribution, usage, storage, and revocation of digital certificates. The PKI binds the public keys to the identity of a person or legal entity, which is typically managed through a trusted Certificate Authority (CA). The PKI hierarchy identifies a chain of trust for a device, program, or other ecosystem elements, and may also provide secure software download requirements and/or secure certificate injection requirements throughout the PKI ecosystem, over which CAs, parties/participants, programs, devices, manufacturers, etc. interact.

Most conventional PKI mechanisms depend on Domain Name System Security Extensions (DNSSEC) but only for specific use cases, and such conventional mechanisms do not allow bootstrapping, nor do they enable the building of a trusted set of Root CAs using consensus, which can be cryptographically verified on a digital or distributed ledger, such as a blockchain, for example.

The emerging Internet of Things (IoT) environment includes end-user devices (i.e., the "things" in the IoT) ranging from sensors to home utilities to medical devices. This IoT environment not only inherits all the known and troublesome security problems present in the Internet, but also augments these problems in additional manners. One such problem is that the human users of these devices are not consistent in enforcing the security of their devices, and this problem continues to increase as the task of ensuring the security of a single smartphone, personal computer, and/or connected device is itself constantly growing. This problem increases exponentially when considering the need to ensure the security of all IoT devices for single individual, where some of the individual devices might be subject to high levels of security, but one of the devices may provide a security hole that risks the security of the other devices.

In critical environments, log and event security is essential, and particularly with respect to considerations such as non-repudiation and integrity within the respective network. Conventional network security techniques, however, have been significantly lacking in these areas. Moreover, scalability of event and log management has been a particular challenge and conventional networks due to the fact that many stakeholders of the network require visibility to events and logs, but conventional security techniques have typically been required to trade security for visibility. That is, as visibility to greater numbers of stakeholders increases, the ability to secure the network and its secure communications has decreased. Accordingly, it is desirable to provide improved systems and methods for securely managing logs and events of a network, and in a scalable manner that does not become less secure as the visibility to network stakeholders increases.

BRIEF SUMMARY

In an embodiment, a security event management system for an electronic connected network includes a public key infrastructure subsystem configured to generate a security ID for a connected device accessing the network, a digital ledger, a trigger list in operable communication with the digital ledger, and an event manager configured to (i) subscribe to the trigger list by defining at least one reportable event of which the trigger list is to advise the event manager, and (ii) receive a notification from the trigger list upon validation of the at least one reportable event behind the digital ledger.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Figure 1:
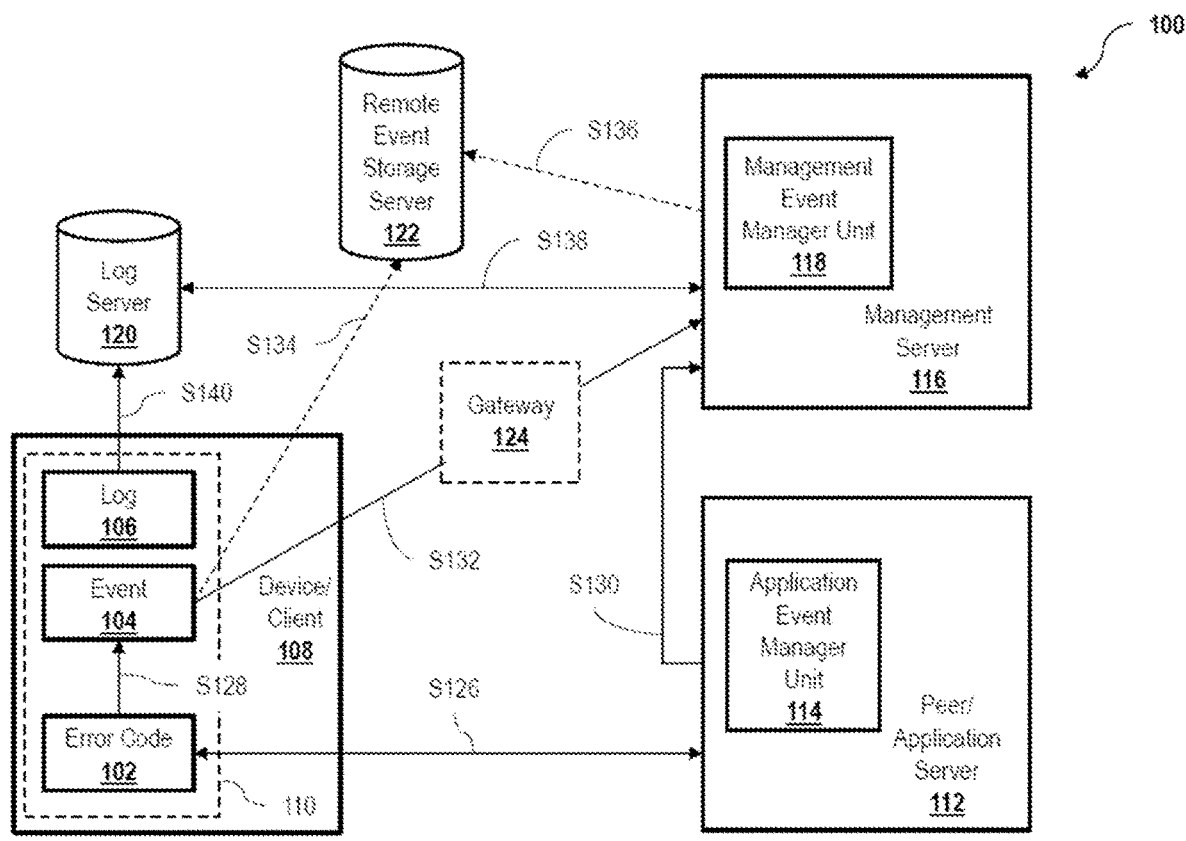
FIG. 1 is a schematic illustration of a network architecture.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

As used further herein, "CA" may refer to a certificate authority hosting a root certificate, and may further include, without limitation, one or more of a CA computer system, a CA server, a CA webpage, and a CA web service.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, unless otherwise stated, the terms "software" and "firmware" are interchangeable, and include any computer program storage in memory for execution by personal computers, workstations, clients, and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events occur substantially instantaneously.

As used further herein, "DNSSEC" refers to a Domain Name System Security Extension or Extensions. DNSSEC includes a suite of specifications for securing types of information provided by the domain name system (DNS) as used in Internet protocol (IP) networks (e.g., the Internet). DNSSEC protects applications, and caching resolvers (i.e., clients) serving such applications) backspace, from using forged or manipulated data. DNSSEC digitally signs information, and a DNS resolver is able to check such digital signatures to verify if received information is identical, unmodified, and/or complete with respect to other data served on an authoritative DNS server.

The present systems and methods herein advantageously utilize distributed ledgers to confirm, validate, and/or record the status of a PKI certificate. The present embodiments may be implemented to augment or, in some circumstances, replace conventional certificate registration and verification practices that rely on trusted parties to record events. The distributed ledgers described and illustrated herein may include, for example, blockchain technology to create digital ledgers for tracking the status of PKI certificates, as well as other information from a PKI subsystem or in a PKI-based ecosystem. For ease of explanation, the following description references blockchains as an exemplary embodiment of distributed ledger technology. A person of ordinary skill in the art though, upon reading and comprehending the present description and associated illustrations, will understand that other examples of distributed ledger technologies may be implemented according to the innovative and advantageous techniques and principles described herein.

That is, in the following disclosure, the phrases "distributed ledger" and "blockchain" are used. In conventional practice literature, these concepts are often considered to be synonymous. However, within this disclosure, these concepts may further differ in terms of their respective use and implementation. For example, in some instances the phrase "distributed ledger" may refer to how the ledger or blockchain is used, namely, the accessible distributed ledger as available to prove the facts of a transaction by virtue of being distributed amongst a consensus pool. A "blockchain," on the other hand, may refer to the technological process by which the distributed ledger is created and operated. Accordingly, a blockchain will create a distributed ledger, but a distributed ledger may also be created by other technology types. In the following description, the phrase "digital ledger" refers to either or both of the distributed ledger and the blockchain.

For ease of explanation, the following description references a "blockchain," or "blockchains," as exemplary embodiments of distributed ledger technology that are intended to indicate a representative example of immutable ledger technology, but are not intended to be limited to blockchain embodiments only. A person of ordinary skill in the art though, upon reading and comprehending the present description and associated illustrations, will understand that other examples of distributed ledger technologies may be implemented according to the novel and advantageous principles herein.

The present solutions are thus advantageously implemented as either standalone systems, or as complementary systems to conventional systems that rely on trusted parties to record events into databases or other record keeping mechanisms, often using trusted labels. In such systems, the relevant information may be tracked and verified (e.g., time, location, duration, number, status, etc.) through the system.

According to the embodiments herein, digital ledgers are implemented to create secure and immutable records of transactions regarding the creation or status of PKI certificates. In these records, the transaction information is encoded into formats, digitally signed using a cryptographic technique, and submitted to a network of processors of a distributed ledger network. The processors validate the submitted transactions for accuracy, and the validated transactions are subsequently added to a queue or stack of the ledger. At some point, according to a predetermined criterion (such as, but not limited to, an interval of time, a volume of data, a number of transactions, or combination of these and/or other factors), the queued or stacked transactions are sequentially hashed (e.g., using a Merkle process), and collectively encoded into a block which is then hashed with the hash of the proceeding block using cryptographic processes. An algorithm will allow multiple processors to select a block from amongst many processors to be the block added to the blockchain.

In examples illustrated herein, the distributed ledger is described, for ease of explanation, as utilizing a blockchain and/or blockchain technology. Blockchaining technology takes transaction information, encapsulates it in a digital envelope or "block" and then the block is cryptographically added (using cipher chaining techniques) to the end of a chain of other transactions. This cryptographic addition incorporates information from prior blocks on the chain to calculate the digital chain or "hash" for this new block. The calculations for cryptographic addition can vary widely in complexity based on the rules of the blockchain. This complexity is purposeful though, in order to prevent modification of the existing blockchain to which is being added. That is, in order to modify an earlier block in the chain, the entire chain from that point forward would need to be recalculated. It is through this technique that the immutability of the chain, and permanency of its public ledger, is maintained. Exemplary systems and methods of blockchain technology are described in greater detail in co-pending U.S. patent application Ser. No. 15/345,411, filed Nov. 7, 2016, U.S. patent application Ser. No. 15/376,375, filed Dec. 12, 2016, U.S. patent application Ser. No. 15/476,111, filed Mar. 31, 2017, and U.S. patent application Ser. No. 15/476,098, filed Mar. 31, 2017, all of which are incorporated by reference herein.

In an exemplary embodiment, details of transaction events (e.g., current status, changes in status) for a particular PKI certificate are encoded into a cryptographically-signed and protected transaction that is submitted to a distributed ledger network, such as a blockchain network, for further processing. Processors of the distributed network process the incoming transactions into blocks, which may then be added to a particular blockchain. Once added to the blockchain (or equivalent entry in an electronic distributed ledger), the transaction may be visible to, but immutable by, appropriate system participants or parties that seek to create a history of disposition and status of the PKI certificate. Such histories may then be more easily verified on the ledger, while being rendered difficult to alter once added to the ledger. In some embodiments, the ledgers may be further configured to also track identities of system endpoints and participants.

In some embodiments, DNSSEC is leveraged as a registry for trust, and also to bootstrap trust. Additionally, the digital ledgers/blockchains may be further leveraged to publish and manage the list of trusted CAs, including recycling/revocation. In some embodiments, consensus-based voting is implemented to "untrust" specific CA certificates, which may be performed in addition to conventional certificate validation mechanisms. The systems and methods described herein may thus be configured to leverage such conventional certificate validation mechanisms as ACME, JOSE, Certificate Transparency (CT), in addition to other known certificate validation mechanisms.

In an exemplary embodiment, the PKI subsystem utilizes an X.509 trust model, in which a trusted third party CA is responsible for signing digital certificates. Accordingly, as described herein, the CA is presumed to have capability to store one or more trusted root certificates (or intermediate certificates) as well as the corresponding private keys. In some embodiments, the CA is further configured to be responsible for maintaining up-to-date revocation information regarding the validity of issued certificates, and will provide information to other ecosystem participants, for example, through an Online Certificate Status Protocol (OCSP). In an exemplary embodiment, the CA further provides information according to a Certificate Revocation List (CRL). The OCSP is an Internet protocol for obtaining a revocation status of an X.509 digital certificate, and is sometimes considered to be an alternative to the CRL. OCSP messages may be communicated, for example, by Abstract Syntax Notation One (ASN.1) encoding over the Hypertext Transfer Protocol (HTTP), from and to OCSP responders of the CA server (or OCSP server).

In an exemplary embodiment, a PKI subsystem includes a CA for issuing PKI certificates and public keys to the system participants. The CA may receive OCSP request messages from system participants and confirm the revocation status of a corresponding certificate (e.g., stored in the trusted database of the CA). The OCSP responder of the CA may transmit an OCSP response message indicating the revocation status (e.g., "valid," "revoked," "unknown," etc., or an error message if the request message may not be processed). In the exemplary embodiment, the CA generates or records the issuance of the public/private keypairs. In some embodiments, the CA further optionally generates and/or records the certificates associated with the keypairs.

In at least one embodiment, a certificate issuance infrastructure of the CA is configured such that each organization/domain of the PKI subsystem hosts autonomous CAs, and issues certificates for that particular organization/domain. Public keys of the autonomous CAs may then be published by the organization/domain in a DNSSEC-enabled DNS record for that organization/domain, and specifics of the DNS record may be determined at a later time. Each organization/domain may then publish or record the public key of its CA on a public blockchain, and the resulting transaction will be viewable as having an unspent condition, and include the domain to which the certificate is tied, as entered in the organization/domain DNSSEC entry. This double-reference mechanism provides a greater depth to the integrity of the registration, and makes subverting the trust system secondly more difficult. Accordingly, such PKI keys may be generated to be long-lived (e.g., 50 years or longer), or relatively short-lived (e.g., in the order of months or only a few years).

From a blockchain perspective, the first time a CA certificate is submitted to the blockchain, it is submitted as a genesis transaction. The genesis transaction may then be spent in two ways (resulting in subsequent transactions): (i) by issuing a new transaction that references the transaction ID from the previous transaction, which is a method of CA certificate renewal; and (ii) by generating a revoke transaction. In an embodiment, the certificate issuance mechanism may implement conventional protocols (e.g., ACME, etc.), or may issue certificates to endpoints during manufacturing (e.g., in the case where the certificate is included on a manufactured device or product).

The present systems and methods provide a mechanism for advantageously producing high fidelity security, IT, network management events, and/or network locks. In an exemplary embodiment, the present techniques leverage a consensus mechanism, such as a blockchain or consensus enabled database, which enables unique benefits over conventional techniques, including without limitation: (i) high integrity event transmission and storage; (ii) permissioned submission and viewing of events; (iii) multiple new options to access and view events; (iv) built-in consolidation to support multiple event systems; and (v) built-in synchronization of events across networks with high fidelity time and event order. The present systems and methods may further enable, without limitation, one or more of: (i) high integrity log transmission and storage; (ii) permissioned submission and viewing of logs; (iii) built-in consolidation to support multiple log management systems; and (iv) built-in synchronization of logs across networks with high fidelity time and event order.

FIG. 1 is a schematic illustration of a network architecture 100. In an embodiment, network architecture 100 is configured to support multiple means of messaging to manage security, IT, and functionality of the network. In the exemplary embodiment, the messaging includes such messaging types as error codes 102, events 104, and logs 106. In an exemplary embodiment, network architecture 100 includes one or more clients or client devices 108, each of which may include a memory or storage device 110 configured to store one or more error codes 102, events 104, and/or logs 106. Network architecture 100 may further include one or more peers or application servers 112 each configured with a respective application event manager unit 114, a management server 116 configured with a management event manager unit 118, a log server 120, an optional remote event storage server 122, and an optional gateway 124.

In exemplary operation, in step S126, error codes 102 from one or more devices 108 are reported to a respective peer/application server 112 in response to protocol or application activities. In an embodiment of step S126, error code 102 may be sent in response to a query or command from another device 108 using the protocol in which the query or command was sent. In step S128, generation of error code 102 may result in a report of event 104. In an embodiment of step S128, generation of error code 102 may similarly result in an entry of log 106.

In further operation of network architecture 100, event 104 may represent a variety of events that may be configured for security, IT, and network management. In step S130, event 104 is reported by application server 112 to management server 116. In some embodiments, event 104 may include error code 102, and event 104 may also be included in log 106. In an embodiment of step S130, in the case where error code 102 is directly reported to one or more application servers 112 (e.g., in step S126), management unit 114 of application server 112 may be further configured to generate event 104, as opposed to event 104 being generated by device/client 108, which capability is particularly useful in the case of constrained devices implemented in the IoT.

In contrast, in some cases, event 104 at device 108 may be immediately actionable by administration and management processes or staff. Accordingly, in step S132, event 104 is directly reported from device 108 to one or more management servers 116. In an alternative embodiment of step S132, event 104 is indirectly reported to management server 116 by way of gateway 124, in which case gateway 124 serves to function as an interim parser or adapter to adapt the format of event 104 (or log 106) for multiple management platforms. Optionally, in the case where management server 116 is not configured to store events 104 within its own resources, device 108 may, in optional step S134, report event 104 to remote event storage server 122. Similarly, where management server 116 receives a reported event 104 from application server 112 (e.g., step S130), in optional step S136, management unit 118 may be further configured to forward reported event 104 to remote event storage server 122.

In still further exemplary operation of network architecture 100, in step S138, management server 116 is further configured to compile events 104 into logs 106 and forward the compiled log result to log server 120. In step S140, logs 106 are forwarded from device 108 to log server 120. In some embodiments of step S140, logs 106 are forwarded to log server 120 on a periodic basis. In other embodiments of step S140, logs 106 are forwarded aperiodically, such as in response to a specific request or a triggering event. In the exemplary embodiment, logs 106 include a variety of information, which may include events 104 and/or error codes 102.

In general operation of network architecture 100, timing of events 104 and entries of logs 106 is important, as well as the particular order of occurrence thereof. Accordingly, in the exemplary embodiment, network architecture 100 may further include a high fidelity time source (not shown in FIG. 1, described further below with respect to FIGS. 2 and 3) for time stamping event timing and log entries for synchronization across the entire network or enterprise being managed (i.e., in which network architecture 100 is implemented).

Figure 2:
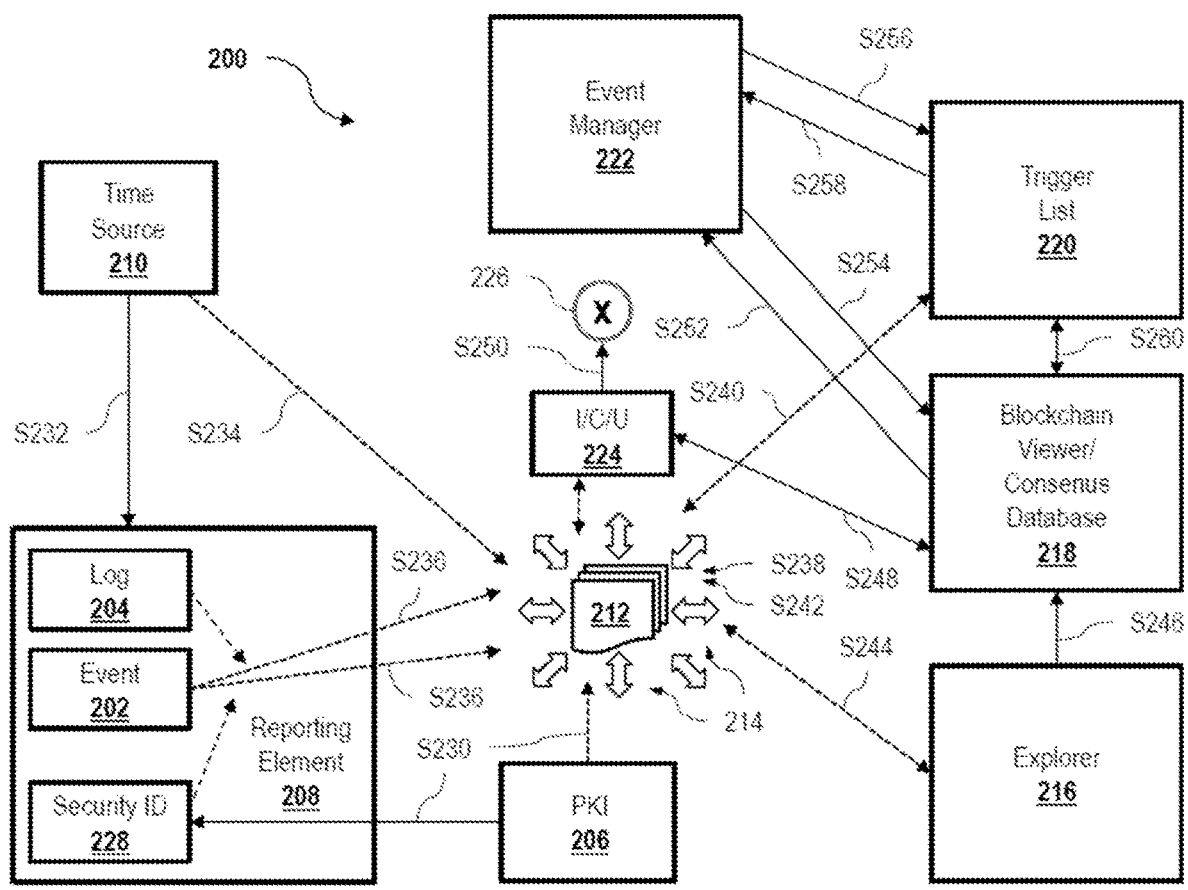
FIG. 2 is a schematic illustration of a secure event management network architecture.

FIG. 2 is a schematic illustration of a secure event management network architecture 200. Event management network architecture 200 is similar, in several aspects, to network architecture 100, FIG. 1, and is also configured to support multiple means of messaging to manage security, IT, and functionality of the network. Accordingly, event management network architecture 200 may be implemented as a standalone system, or may be fully integrated with network architecture 100 in a cooperative manner. Elements of architecture 200 having the same label as respective elements of architecture 100 it may therefore be considered to have a substantially similar form and/or function.

In an exemplary embodiment, event management network architecture 200 is configured to manage events 202 and logs 204, and includes one or more of a PKI subsystem 206, one or more reporting elements 208 (e.g., devices 108, FIG. 1), a time source 210, and a digital ledger 212 having a plurality of nodes 214. In the exemplary embodiment, digital ledger 212 is a blockchain subnetwork or a consensus-managed database, and nodes 214 are blockchain nodes. Event management network architecture 200 may further include one or more of a ledger explorer 216, a ledger viewer database 218, a trigger list 220, an event manager 222, and an integrity checking unit 224 configured to generate an alert 226.

In exemplary operation of architecture 200, all transactions may occur over secure (e.g., authenticated and encrypted) channels, facilitated, for example, using PKI subsystem 206, or a similar ID management and key distribution system (e.g., supportive of LTE and specified by 3GPP and GSMA), which is configured to generate a security ID 228. In an exemplary embodiment, in step S230, security ID 228 is provisioned to each reporting element 208, as well as other respective components, that accesses network architecture 200. Security ID 228 may, for example, include one or more of a unique identifier, a corresponding secret, and a certificate or profile, which may be authenticated and encrypted using asymmetric systems such as PKI, and/or symmetric systems such as 3GPP/GSMA, according to conventional techniques.

In step S232, time source 210 time stamps events 202 such that time distribution may be secured. In an exemplary embodiment, time source 210 is a high fidelity time source, and time stamping may be enabled through a network time protocol (NTP) or using a time stamp of a global positioning system (GPS, not separately shown in FIG. 2), as well as the location information thereof, if desired. In step S234, timing information from time source 210 is added as an additional field to information sent to processing nodes 214. In an embodiment of step S234, the timing information establishes the time at which the respective node 214 received the message, and enables reliable synchronization with other nodes 214 and the rest of the blockchain 212.

In an exemplary embodiment, the determination of what events 202 are reportable, and how events 202 are reported, is provisioned according to settings established, for example, using simple network management protocol (SNMP) triggers. In this example, the provisioning of such settings occurs over secure channels, as described above, and is authenticated using strong identities established using PKI subsystem 206. In the case where more significant security levels are desirable, the individual instances of provisioning may themselves be recorded as events 202, and then be processed in the same manner. In some embodiments, provisioning events 202 may be further logged as described further below with respect to FIG. 3.

In further exemplary operation of network architecture 200, when event 202 is triggered, reporting element 208 may be configured to compile event 202 as a blockchain transaction/database entry, in which case event 202 is time stamped (e.g., according to step S232), the identity of reporting element 208 is included, and the entire compiled message is signed using keys issued to reporting element 208, and using security ID 228 (e.g., from step S230). In step S236, the signed transaction/database entry is securely transported to one or more nodes 214 of blockchain network/distributed consensus-enabled database 212. Through operable communication with time source 210, blockchain network 212 protects the integrity and time fidelity of event 202 in a significantly more reliable manner than is available through conventional techniques. Additionally, the present systems and methods still further improve over conventional techniques by utilizing security ID 228, and by transmitting over secure channels, to ensure the non-repudiation and authenticity of event 202.

In step S238, upon receipt of the transaction or database entry, the transaction data is validated among the several nodes 214 to verify that the transaction is both correct, and from an authorized source. In an exemplary embodiment of step S238, the validation operation further verifies that the time stamp of the transaction is within predefined thresholds, which creates an additional level of reliability regarding the authenticity and time fidelity of event 202. For example, one or more of nodes 214 may be configured to digitally sign the resultant transaction file, thereby providing additional integrity to the transaction through the hashing operation, and more reliable acceptance of the transaction through proof of possession of a permissioned private key, prior to consensus being reached within blockchain network 212.

In some embodiments, the validation operation step S238 may not include readable or transparent events/logs. In such instances, network architecture 200 may be further configured to implement zero-knowledge proofs if desired by the network operator. In other embodiments, it may be valuable to store and pass encrypted data within a block chain network 212 from one node 214 to other nodes 214 for submission. Such other nodes 214 may then sign the received package, and also verify (i) that the package of bits was received, (ii) the hash of the received bits, and (iii) that the header/metadata of the package is accurate, but without having knowledge of the contents of the package itself.

In the case where smart contracts are implemented within network architecture 200 (described further below), in optional step S240, the validation operation of step S238 may be further configured to notify trigger list 220 to update or change a smart contract contained within trigger list 220.

Referring back to step S238, in the case where digital ledger 212 is a block chain network, the transaction is replicated across network blockchain nodes 214 (e.g., processors, validators, and/or miners, according to the particular security model of the blockchain) to produce blocks and execute a consensus among nodes 214. Alternatively, in the case where digital ledger 212 is a consensus database, in step S242, the data entry is replicated and voted according to a selected consensus model the database, which still further protects the integrity and time fidelity of event 202.

Because blockchains are considered to be inefficient mechanisms for conducting data operations (e.g., searches, queries, views, etc.), in step S244, network architecture 200 is further configured to cause ledger explorer 216 to parse blocks, as the individual blocks are created, and produce database entries for ledger viewer database 218. In step S246, blockchain viewer/database 218 replicates the blockchain of blockchain network 212 using an appropriate schema. In the case where digital ledger 212 is a consensus database, step S246 is optional, and the consensus database entries may instead be queried and viewed directly without first replicating the blockchain.

In step S248, network architecture 200 verifies the integrity of the replicated/viewed blockchain in ledger viewer database 218 against the actual blockchain of digital ledger/blockchain network 212. In an exemplary embodiment of step S248, verification is performed according to a random walk approach using integrity checking unit 224 to check the contents of database entries against the contents of their corresponding blockchain transactions. In some embodiments, integrity checking unit 224 is configured to verify both the signature of the transaction, and the blocks in which the transaction(s) are stored. In the case of an integrity check failure, in step S250, alert 226 is generated to function as an alarm to notify the operators of the blockchain.

In an exemplary embodiment, event manager 222 is either advised of (i.e., a push), or queries about (i.e., a pull) of events 202. That is, event manager 222 may be configured to execute one or both of a pull mechanism and a push mechanism. In the case where a pull mechanism is implemented, in step S252, event manager 222 queries blockchain viewer/consensus database 218 as desired or needed, and then access viewer/database 218 to set triggers and/or view events 202 to enable authentication using security ID 228 (e.g., step S248, etc.). In step S254, viewer/database 218 is further configured to notify event manager 222 of the authentication, or of alert 226 in the case of an integrity check failure.

In the case where a push mechanism is implemented by event manager 222, the respective push mechanism may implement a publish/subscribe model. That is, in step S256, event manager 222 subscribes to trigger list 220. In an example of step S256, event manager 222 subscribes to trigger list 220 by submitting a smart contract defining what particular events 202 (e.g., including a device ID) of which event manager 222 is to be advised. In step S258, upon validation of the relevant transactions of the defined events 202, the smart contract of trigger list 220 will trigger a notification of the relevant event 202 to event manager 222. In an exemplary embodiment of step S258, validation by trigger list 220 is performed directly with digital ledger 212 (e.g., step S240, described above). That is, the smart contract validates directly off the blockchain of digital ledger 212, which will result in a fast conveyance of reportable events to event manager 222. Alternatively, validation may be performed indirectly with digital ledger 212, and in step S260, trigger list 222 validates by way of viewer/database 218 (e.g., including step S248).

The implementation of the direct push mechanism, as opposed to the indirect push mechanism, may be determined according to the provisioned criticality of event 202, as predetermined by the network operator, or based on the suitability of the mechanism for the particular configuration of viewer/database 218 that is used to view the transaction. In an embodiment, respective interfaces between event manager 222 and trigger list 224 the publish/subscribe model may leverage SNMP to configure the smart contract, or a different application programming interface (API) suitable to provisioning of event 202.

According to the enhanced authenticity and time fidelity capabilities of network architecture 200, the scalability problems of the conventional security techniques may be avoided. That is, through application of a blockchain or consensus-managed database, the present embodiments advantageously enabled to meet both the security and scalability requirements of the present and future connected infrastructures.

Figure 3:
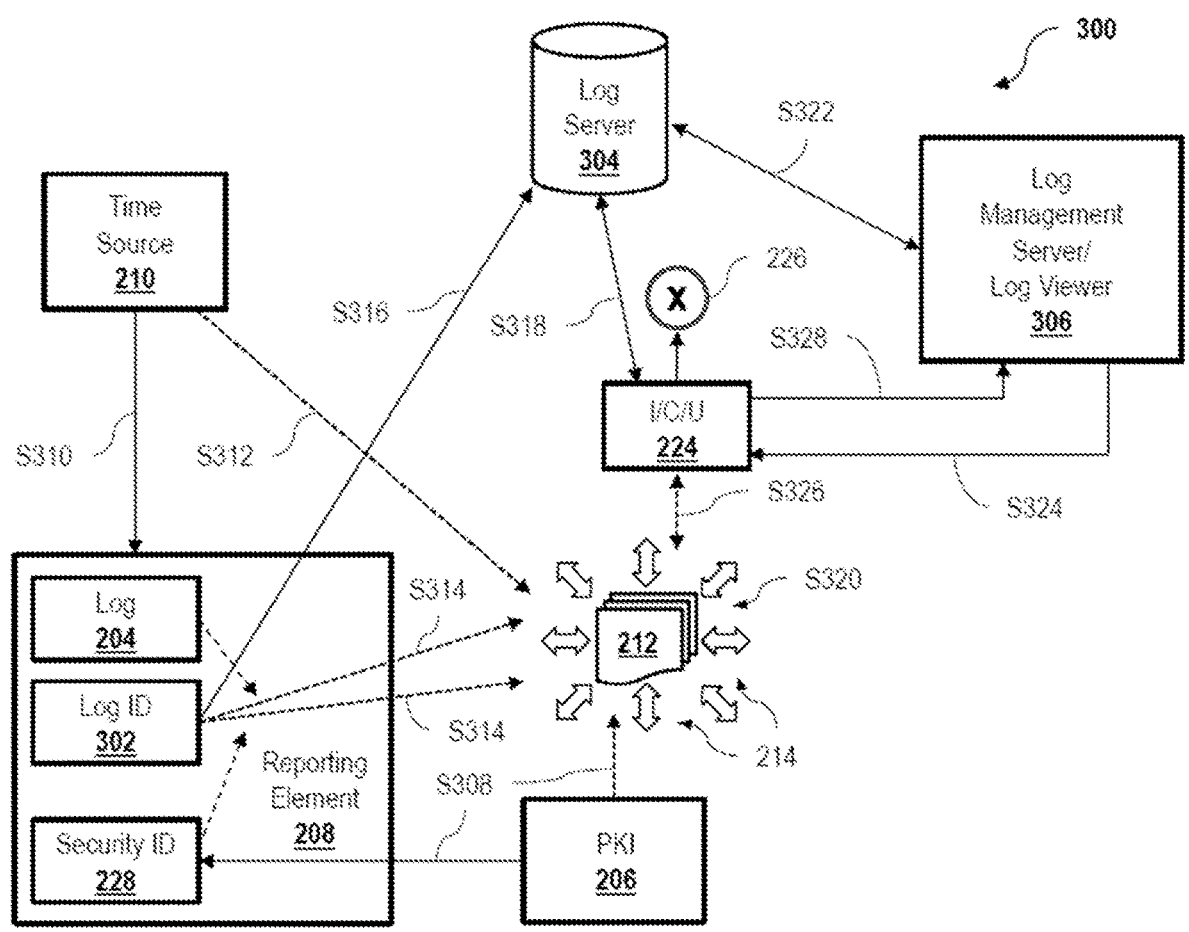
FIG. 3 is a schematic illustration of a secure log management network architecture.

FIG. 3 is a schematic illustration of a secure log management network architecture 300. Log management network architecture 300 is similar to event management network architecture 200, FIG. 2, and may include one or more of the same elements thereof (e.g., PKI infrastructure 206, reporting element 208, time source 210, digital ledger 212 and nodes 214, integrity checking unit 224, etc.), which may also function in a substantially similar manner. Accordingly, log management network architecture 300 may be implemented as a standalone system, or may be fully integrated with event management network architecture 200. In at least one embodiment, log management network architecture 300 represents a portion of the same network architecture that includes event management network architecture 200 as another portion thereof.

Thus, similar to event management network architecture 200, log management network architecture 300 is also configured to manage logs 204 using PKI subsystem 206, reporting elements 208, time source 210, and digital ledger 212, as described above. Also similar to event management network architecture 200, transactions within log management network architecture 300, including log entries, may also occur over secure channels facilitated using PKI subsystem 206 (or similar key distribution subsystem) and security ID 228 provisioned to reporting element 208.

In the exemplary embodiment, reporting element to it is further configured to include a log ID 302 for a transaction relevant to log 204, and log management network architecture 300 further includes a log server 304 and a long management server/log viewer 306.

In an exemplary embodiment, in step S308, security ID 228 is provisioned to each reporting element 208, as well as other respective components, that accesses network architecture 300, similar to step S230, FIG. 2. In step S310, time source 210 time stamps log entries and the forwarding time of logs 204 such that time distribution of logs 204 may also be secured. In step S312, timing information from time source 210 is added as an additional field to log information sent to processing nodes 214, and may establish the time at which the respective node 214 received the respective log entry. In an exemplary embodiment, the determination of what constitutes loggable events, and how such are reported, may also be provisioned according to settings established using SNMP triggers, provisioned over secure channels and authenticated using strong identities. Where significant security is required, the provisioning of such log entries may itself be recorded as a loggable event, as described above with respect to FIG. 2.

Accordingly, in the exemplary embodiment, all entries into log 204 may be time stamped. Additionally, in the case where secure ID 228 is stored securely, such as by a trusted platform module (TPM) with controlled access, the log entries may also be signed. In the case where log 204 is to be forwarded, the time stamped aggregate log file may be signed using secure ID 228, and this signature may then be compiled into a time stamped message, including the identity of reporting element 208, and then the entire compiled message may be signed using keys issued to the element, as described above.

In step S314, the signed transaction/compiled log message is securely transported to one or more nodes 214 of blockchain network/distributed consensus-enabled database 212, which is in operable communication with time source 210 to protect the integrity and time fidelity, and also to ensure the non-repudiation and authenticity, of log 204 and related events 202.

In step S316, the signed log is forwarded, using secure transmission channels, to log server 304. In an embodiment of step S316, an effective off chain log record is created. Nevertheless, in step S318, the integrity and time fidelity of the log record in log server 304 is verified through communication with integrity checking unit 224, which is configured to verify the corresponding blockchain transaction or consensus database record of the off chain log record. In step S320, the hash, signature, time of log entry (or event), time of receipt by a node 214 may all be recorded on the blockchain and verified by other nodes 214. That is, when respective blockchain nodes 214 received a transaction, or database nodes 214 received a database entry, the data thereof may be validated to ensure that the data is from an authorized source and that the transaction or entry is correct. In an exemplary embodiment of step S320, validation includes a verification that the time stamp of the respective transaction is within defined thresholds to further increase the authenticity and time fidelity of the log integrity record/transaction.

In the exemplary embodiment, log management server/log viewer 306 (or an equivalent tool) is used to access log server 304. Accordingly, in this embodiment, in step S322, log server 304 is further configured to notify log management server/log viewer 306 of the received log record. Log management server/viewer 306 may thus be optionally configured to, upon notification in step S322, perform a further integrity check of the log record. That is, in step S324, log management server/viewer 306 queries integrity checking unit 224 regarding the received log record. In step S326, integrity checking unit 224 checks the contents of the log record against the contents of corresponding blockchain transactions or database entries in digital ledger 212 including, for example, transaction/entry signatures and blocks in which the relevant data thereof is stored. In step S328, integrity checking unit 224 notifies log management server/viewer 306 of either an authentication of the long record, or alert 226 (i.e., in the case of an integrity check failure).

In an exemplary embodiment of log management network architecture 300, integrity check operation of the long record may be accelerated using a blockchain explorer (e.g., ledger explorer 216, FIG. 2) and a blockchain viewer (e.g., ledger viewer database 218, FIG. 2) to leverage the integrity checking by integrity checking unit 224, as described above with respect to event management network architecture 200.

Accordingly, systems and methods according to network architectures 200, 300 are advantageously capable of significantly increasing the visibility of events and/or logs to greater numbers of stakeholders, but without sacrificing the security or integrity of logs it is and events security, or the reliability of transaction non-repudiation. The present embodiments therefore provide significant advantages over the conventional security systems.

Exemplary embodiments of systems and methods for secure event and log management are described above in detail. The systems and methods of this disclosure though, are not limited to only the specific embodiments described herein, but rather, the components and/or steps of their implementation may be utilized independently and separately from other components and/or steps described herein.

Although specific features of various embodiments of the disclosure may be shown in some drawings and not in others, this convention is for convenience purposes and ease of description only. In accordance with the principles of the disclosure, a particular feature shown in a drawing may be referenced and/or claimed in combination with features of other drawings.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a programmable logic unit (PLU), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments, including the best mode, and to enable a person skilled in the art to practice the embodiments, by making/using/performing the disclosed devices, systems, and methods. The patentable scope of the disclosure is defined by the claims, and may include other examples that may occur to those skilled in the art. Such examples are intended to be within the scope of the claims if they have structural elements that do not differ from the literal language of the claims, or if they include equivalent structural elements with insubstantial differences from the literal language of the claims.

The invention claimed is:

1. A security event apparatus for managing a connecting device attempting to access an electronic connected network using a public key infrastructure (PKI) system configured to generate a certificate for the connecting device and provision the certificate for submission as a genesis transaction of a digital ledger in operable communication with the PKI system and at least one of the connecting device and the electronic connected network, the apparatus comprising:
   a trigger list in operable communication with the digital ledger; and
   a processor; and
   a memory having computer-executable instructions stored therein, which, when executed by the processor, cause the processor to;
      subscribe to the trigger list by defining at least one reportable event, related to the certificate, of which the trigger list is to advise the apparatus, and
      receive, from the trigger list, a validation notification of the at least one reportable event,
      wherein the validation notification is based on a spend condition of the certificate in a second transaction of the digital ledger subsequent to the genesis transaction, and
      wherein the spend condition indicates that the certificate is (i) renewed, or (ii) revoked.

2. The apparatus of claim 1, wherein the digital ledger includes a blockchain network, wherein the genesis transaction precedes the second transaction and all other transactions in the digital ledger, and wherein the second and all other transactions in the digital ledger may trace to the genesis transaction.

3. The apparatus of claim 2, wherein the blockchain network includes a plurality of blockchain nodes.

4. The apparatus of claim 3, wherein the plurality of blockchain nodes are configured to validate the certificate for the second transaction submitted to the blockchain network for the at least one reportable event, and wherein the second transaction is one of (i) a renewal transaction that references a transaction ID of the genesis transaction, and (ii) a revoke transaction.

5. The apparatus of claim 1, wherein the instructions further cause the processor to define the at least one reportable event according to provisioning settings conveyed to the trigger list.

6. The apparatus of claim 5, wherein the provisioning settings include one or more simple network management protocol triggers.

7. The apparatus of claim 5, wherein the instructions further cause the processor to convey the provisioning settings to the trigger list over a secure channel.

8. The apparatus of claim 7, wherein the secure channel includes an authentication capability and an encryption capability.

9. The apparatus of claim 8, wherein the PKI system is further configured to verify an authentication of the authentication capability using the certificate.

10. The apparatus of claim 7, wherein the instructions further cause the processor to convey of the provisioning settings to the trigger list over the secure channel using a reportable provisioning event.

11. The apparatus of claim 10, further comprising an event storage device configured to record the at least one reportable event and the reportable provisioning event.

12. The apparatus of claim 11, wherein the event storage device is disposed (i) integrally within the apparatus, or (ii) remotely from the apparatus.

13. The apparatus of claim 2, further comprising a timing device configured to timestamp at least one of a (i) triggering of the at least one reportable event, (ii) provisioning of the at least reportable one event, and (iii) compiling of the at least one reportable event.

14. The apparatus of claim 13, wherein the at least one reportable event is a compiled message including a timestamp from the timing device, a signature based on a key from the PKI system, and an identity of the connecting device.

15. The apparatus of claim 13, wherein the timing device is further configured to synchronize the connected device with the blockchain network.

16. The apparatus of claim 3, further comprising a blockchain viewer configured to replicate a blockchain of the blockchain network.

17. The apparatus of claim 16, further comprising a blockchain explorer configured to (i) parse individual blocks from respective ones of the blockchain nodes, and (ii) produce database entries for the blockchain viewer from the parsed blocks.

18. The apparatus of claim 16, further comprising an integrity checking unit configured to verify the replicated blockchain of the blockchain viewer against the blockchain of the blockchain network.

19. The apparatus of claim 16, wherein the instructions further cause the processor to query the blockchain viewer about the at least one reportable event (i) directly, or (ii) indirectly through the trigger list.

20. The apparatus of claim 16, wherein the instructions further cause the processor to subscribe to the trigger list using a smart contract, and wherein the notification of the validated at least one reportable event is received automatically based on the smart contract.

\* \* \* \* \*